United States Patent [19]
Chang et al.

[11] Patent Number: 5,644,486
[45] Date of Patent: Jul. 1, 1997

[54] PROGRAMMABLE CONTROLLER FOR MECHANICAL SYSTEMS

[75] Inventors: Sung S. Chang, Stamford; James L. Harman, Southport; Gary Steven Jacobson, East Norwalk; Wesley A. Kirschner; Micheal J. Ramadei, both of Trumbull; Eric L. Zuidema, Norwalk, all of Conn.

[73] Assignee: Pitney Bowes Inc., Stamford, Conn.

[21] Appl. No.: 327,246

[22] Filed: Oct. 24, 1994

[51] Int. Cl.$^6$ .................................................. G06F 19/00
[52] U.S. Cl. ........................................ 364/132; 364/140
[58] Field of Search .................................. 364/132, 131,
364/133, 134, 138, 167.01, 140, 141, 146,
147, DIG. 2 MS File; 395/200.05, 200.07,
892, 853

[56] References Cited

U.S. PATENT DOCUMENTS

| | | | |
|---|---|---|---|
| 4,747,048 | 5/1988 | Mueller | 364/184 |
| 4,977,494 | 12/1990 | Gabaldon et al. | 364/167.01 |
| 4,988,935 | 1/1991 | York | 318/568.18 |
| 5,162,986 | 11/1992 | Graber et al. | 364/146 |
| 5,255,188 | 10/1993 | Telepko | 364/413.27 |
| 5,321,603 | 6/1994 | Schwenke | 364/146 |
| 5,329,579 | 7/1994 | Brunson | 364/132 X |

Primary Examiner—Joseph Ruggiero
Attorney, Agent, or Firm—Ronald Reichman; Robert H. Whisker; Melvin J. Scolnick

[57] ABSTRACT

An apparatus for controlling a mechanical system in response to messages from a host computer system. The apparatus includes a conventional communications link for communicating messages from the host computer system to a motion control processor and interface and driver circuits for converting digital signals generated by the motion control processor in response to messages from the host computer system into control signals having appropriate waveforms and timing for controlling a particular mechanical system. The motion control processor is programmed to perform a number of tasks in accordance with a schedule downloaded from the host computer system. The host computer system downloads profiles which consist of series of segments consisting of data structures which define elements in the mechanical system to be controlled, identify functions to be performed and include necessary data. Tasks performed by the motion control processor include a communications interface task for handling messages from the host data system, a profile handler task for executing profiles, a motion control task for controlling motors in the mechanical system, and a read sensors task for reading sensor in the mechanical system. Other conventional, non-critical tasks may be performed by the motion control processor on a less frequently scheduled basis or in a background mode of operation. New profiles, schedules, and tick period duration may be down loaded from the host computer system dynamically, during operation of the mechanical system to provide highly flexible, adaptive control of the mechanical system.

19 Claims, 9 Drawing Sheets

PROGRAMMABLE CONTROLLER FOR MECHANICAL SYSTEMS

BACKGROUND OF THE INVENTION

The subject invention relates to a programmable controller for controlling the operation of mechanical systems. More particularly it relates to a microprocessor based controller particularly suited for control of paper handling systems.

Controllers for mechanical systems are well known. Such systems provide control signals to a mechanical system to control the operation of actuators such as motors and solenoids in response to commands from a host computer system and signals from sensors in the mechanical system. For mechanical systems such as paper handling systems which transport and perform operations on a work piece such as a sheet of paper, an envelope, or a completed mail piece, such controllers are sometimes referred to as motion controllers. In recent years, with the steadily increasing availability and decreasing cost of microprocessors, such controllers have most often been implemented as programmable controllers based upon a dedicated microprocessor.

While generally such programmable controllers have functioned well they have typically suffered from certain problems and disadvantages. Even with the high speed of modern microprocessors in complicated mechanical systems where numerous functions must be controlled simultaneously the processing load on such controllers is often so great that the load must be divided among a number of dedicated microprocessors. Where such controllers are programmed independently to control differing functions the typical result is that each microprocessor will operate in a way which bears little relation to other microprocessors in the system, increasing the system complexity and decreasing system maintainability. Further, once such controllers have been programmed the program structure and the rates at which sensors in the mechanical system are sampled and control signals are generated for the mechanical system are substantially fixed; requiring that the initial program anticipate the full range of possible operating conditions or accept less than optimal performance for other than nominal conditions.

Additionally, it would be highly desirable to provide a programmable controller, and particularly a programmable motion controller, which would be suitable for a wide range of applications.

Thus it is an object of the subject invention to provide a programmable controller, and particularly a programmable motion controller, which is useful over a wide range of applications and which has increased flexibility to respond to changing conditions.

DEFINITION

As used herein the following terms have the meaning set forth.

Profile: A sequence of segments whose execution by a motion control processor controls a mechanical system to carry out a corresponding mechanical function.

Sanity Check: A high level examination of a profile to determine superficial consistency with the mechanical system (e.g. assuring that all elements acted upon exist and are not incompatible with the required action; such as attempting to accelerate a sensor).

Segment: A data element including identification of the motor, solenoid or sensor effected by the segment command (if any); a command to be executed by the motion control processor during the segment; and any information required for execution of the segment command, Preferably a segment also includes: an optional timeout threshold which defines the longest time (i.e. number of tick periods) for which the segment may remain active; and an optional identification of a flag to be set when the segment is completed.

BRIEF SUMMARY OF THE INVENTION

The above object is achieved and the disadvantages of the prior art are overcome in accordance with the subject invention by means of an apparatus for controlling a mechanical system in response to messages from a host computer system which includes a communications link for receiving messages from the host computer and an interface for transmitting control signals to, and receiving status signals (i.e. signals representative of various operating conditions or states) from, the mechanical system.

In accordance with one aspect of the subject invention the mechanical system operates under selected of profiles which are selected by the host computer system by means of a first class of the messages which activates selected profiles previously stored in the motion control processor, and a second class of the messages which cancel selected previously activated profiles.

In accordance with another aspect of the subject invention a third class of messages downloads profiles from the host computer system for storage in the motion control processor. The new profiles may be downloaded from the host computer system during operation of the mechanical system to change operating parameters of the mechanical system.

In accordance with another aspect of the subject invention and motion control processor executes a selected set of profiles in accordance with the messages, the status signals and a schedule stored in the motion control processor to control the mechanical system to carry out a corresponding function.

In accordance with yet another aspect of the subject invention the schedule is made up of a sequence of tick periods having a selected duration. Both the schedule and the associated tick period duration can be downloaded from the host computer system during operation of the mechanical system to optimize operation of the mechanical system.

In accordance with another aspect of the subject invention, the motion control processor executes a profile handler task in accordance with the schedule, the profile handler task servicing each profile in the set of profiles.

In accordance with another aspect of the subject invention the motion control processor executes a motion control task in accordance with the schedule, the motion control task responding to changes in the operation status of motors as determined by the profile handler task to change the operating mode of corresponding motors.

In accordance with another aspect of the subject invention the motion control processor executes a plurality of tasks in accordance with the schedule, the tasks including:

- a communications interface task for handling transmission of messages to the host computer system;
- a profile handler task for executing a selected set of profiles to control the mechanical system to carry out corresponding mechanical functions;
- a motion control task, responsive to the profile handler task to control operation of motors in the system; and
- a read sensors task to read the status of sensor in the mechanical system.

Thus it can be seen that the subject invention achieves the stated object and overcomes the disadvantages of the prior art by means of a motion control processor having a general purpose software architecture driven by data structures (i.e. profiles) downloaded from a host computer system to provide a controller having a wide range of applicability, where the profiles and the timing of control functions can be modified by the host computer system during operation of the mechanical system to optimize operation of the mechanical system. Other objects and advantages of the subject invention will be apparent to those skilled in the art from consideration of the attached drawings and the detailed description of preferred embodiments set forth below.

DETAILED DESCRIPTION OF PREFERRED EMBODIMENTS OF THE SUBJECT INVENTION

Figure 1:
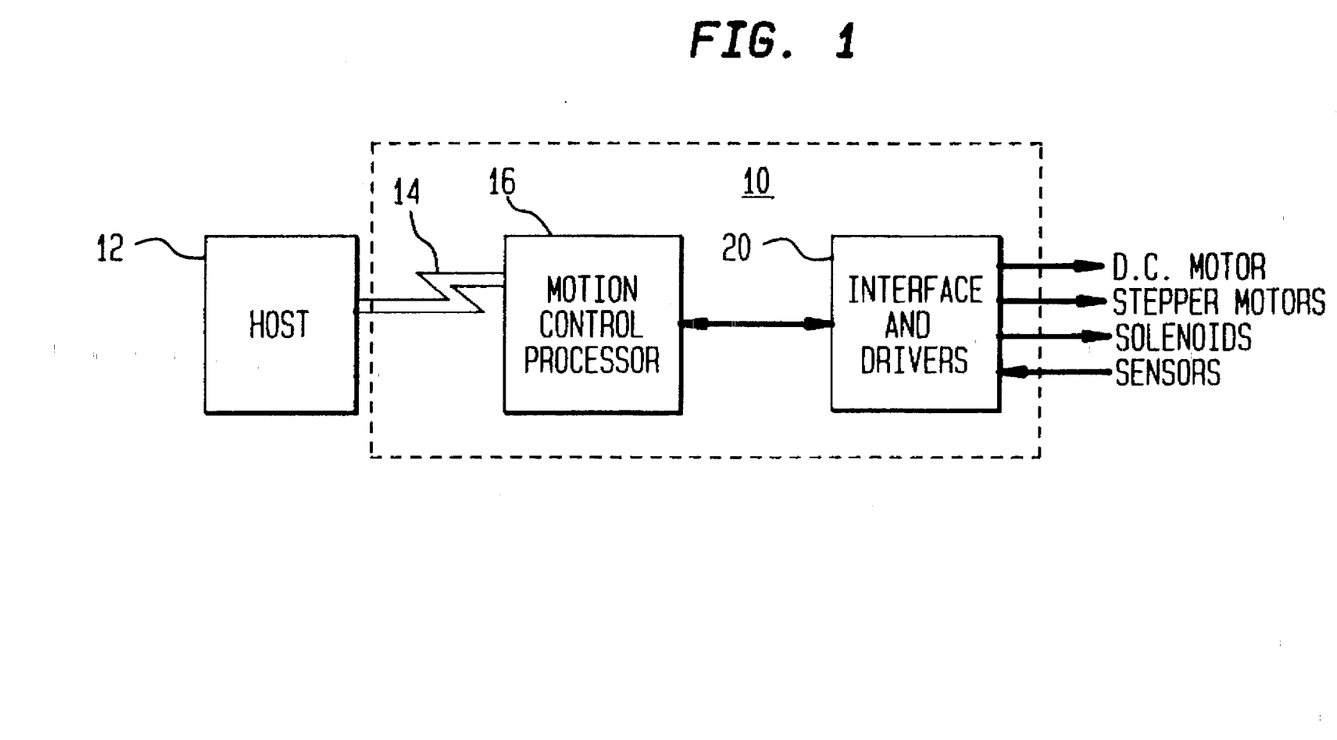
FIG. 1 is a schematic block diagram of an apparatus for control of a mechanical system in accordance with the subject invention.

In FIG. 1, an apparatus 10 in accordance with the subject invention is connected to host computer system 12 through communications link 14 for transmission of messages between host computer system 12 and motion control processor 16. Host computer 12 and communications link 14 may be any suitable computer system and communications link having the necessary computational power and communications capacity; the details of which form no part of the subject invention. Motion control processor 16 is preferably a Hitachi model H8/3003 processor, and is connected to control a mechanical system through interface and drivers 20.

Interface and drivers 20 comprises circuitry which converts the digital output of motion control processor 16 into control signals having the proper waveform and timing to control the mechanical system. Details of the design of interface and drivers 20 will of course depend upon the nature of the mechanical system to be controlled and the processor selected as motion control processor 16. Such design would be a matter of routine for a person of ordinary skill in the art and need not be discussed further here for an understanding of the subject invention. Generally apparatus 10 will output control signals to DC motors, stepper motors, and solenoids and receive status signals from sensors in the mechanical system.

Host computer system 12 controls apparatus 10 by communication of messages. Messages transmitted from host computer system 12 to motion control processor 16 include the following:

Profile Download: This message downloads profiles from host computer system 12 to motion control processor 16. Typically all profiles will be downloaded on power up or when motion control processor 16 is otherwise initialized, but it is within the contemplation of the subject invention that profiles can be downloaded during operation of the mechanical system to change the operating parameters of the system.

Schedule Download: This message downloads the schedule and tick period to motion control processor 16. As with the Profile Download it is typically sent when motion control processor 16 is initialized, but may be sent during operation of the mechanical system to optimize operation of the mechanical system.

Motor Configuration Block Download: This message downloads information which describes motors in the mechanical system to motion control processor 16. Such information includes motor type and any necessary operating parameters and the logical port to which the motor is connected. Typically this information will be downloaded when motion control processor 16 is initialized, but since this information will remain constant unless there is a change in the mechanical system it may be permanently stored in apparatus 10 in read-only-memory or in any other convenient manner.

Sensor Configuration Block Download: This message downloads information describing sensors in the mechanical system to motion control processor 16. The information includes the type of sensor, any parameters necessary to calibrate the sensor and the logical port to which the sensor is connected. Similarly to the Motor Configuration Block this information is typically downloaded when motion control processor 16 is initialized, but may be stored in permanent or non-volatile form in motion control processor 16.

Start Profile/Cancel Profile: These messages select and deselect profiles previously stored in motion control processor 16 to define a selected set of profiles which are executed at any instant to control operation of the mechanical system.

It should be noted that these messages are typically not time critical. Typically actual execution of a profile will await a flag or timeout condition so that the Start Profile message is transmitted a long time before actual activation of the profile. Also, profiles can either loop continuously or for a specified number of iterations; and profiles which are completed self-cancel. Thus, Start Profile Messages need only be sent to start a new profile and Cancel Profile messages are typically sent only in response to an error condition. Also, default profiles, schedules, and configuration blocks can be stored in read-only-memory of the motion control processor.

Read Sensors: This messages requests the motion control processor to return the status of all sensor flags to host processor 12.

Other messages which may be included are: Emergency Stop (which cancels all profiles), Examine Data Log, Set Data Log Parameters, Examine Memory, Modify Memory, Start Diagnostics, and Abort Diagnostics. These messages and the functions they initiate, while useful, form no part of the subject invention and need not be discussed further here.

Messages sent from motion process controller 16 to host computer system 12 include:

Profiles Stored: This message responds to the Profile Download message to identify the status of the storage of profiles downloaded.

Profile Status: This message is generated by an executing profile to return status to host computer system 12.

Sensor State Response: This message responds to the Read Sensor message to return the state of the sensors in the mechanical system.

In other embodiments motion control processor 16 will return appropriate messages in response to the additional messages sent by host computer system 12 as described above. These responses also form no part of the subject invention and needs-not be described further here.

The profiles which are executed by motion process controller 16 consist of sequences of segments. A segment is a data structure which includes elements as set forth in the above Definitions. Each segment includes a single segment command which controls the motion control processor 16 to carry out one operation. It should be noted that in general the operation will not be carried out and the segment will not be completed the first time that segment is serviced by motion control processor 16. For example, a segment command may control motion control processor 16 to wait for a particular flag. Since the wait time is not known and generally will be much longer than a tick period the segment preferably includes a timeout threshold. Each tick period (i.e. each time a segment is serviced) a counter is incremented, and when the counter exceeds the timeout threshold motion control processor 16 executes an error routine, as will be described below.

Segment commands used in 8 preferred embodiment of the subject invention are set forth in Table I.

TABLE I

| Profile Cmd | Action | Profile_Info required for this segment |
|---|---|---|
| CF | Check Flags | Next_Seg_Flag - Flag to go to next segment<br>Branch_Flag - Flag that will lead to a branch<br>Branch_Info - Profile & Segment to branch to |
| CLF | Clear Flag | Flag Identification Number to clear |
| DT | Delay Time | Time to wait, Branch_Flag, Branch_Info |
| SM | Send Msg to Apollo Controller | Message_Type (ie: profile complete) |
| MON | Turn on the motor | No data - just turn motor on to the hold position |
| MOFF | Turn off the motor | Flag information |
| MBRK | Brake the motor | Flag information, Braking Time, PWM Rate to brake at |
| MS | Motor Slew | Duty Cycle (Velocity for an open loop motor), Flag information |
| MSACT | Set Accel/Decel with a lookup table | Starting PWM or Step Index in table, Number of steps to traverse table, Accel/Decel Flag, Direction of Motor, Flag information |
| MSACL | Set Accel/Decel linearly | PWM or Steps, Number of Tick Periods, Final PWM or Step Rate, Accel/Decel flag, Direction of Motor, Flag information |
| MPOS | Motor Positional Move | Starting PWM or Step Index in table, Number of steps to traverse table, Number of steps to slew, Accel/Decel Flag, Direction of Motor, Flag Information |
| LE | Lead Edge | Sensor Timeout Window, Flag information |
| TE | Trail Edge | Sensor Timeout Window, |

TABLE I-continued

| Profile Cmd | Action | Profile_Info required for this segment |
|---|---|---|
| | | Flag information |
| ES | Energize Solenoid | Flag information |
| DS | Drop Solenoid | Flag information |
| TERM | Terminate Profile | Flag information |
| CB | Conditional Branch | Flag information |

As can be seen, each segment is a data structure which defines an operation to be carried out by motion control processor 16 and provides the information necessary for that command to be carried out, and identifies the element of the mechanical system upon which the segment command acts. By downloading profiles consisting of a sequence of such segments to motion control processor 16 control of desired functions to be carried out by the mechanical system can be achieved by executing the segment commands through a command-independent software architecture.

It should be noted that it is within the contemplation of the subject invention to dynamically change profiles and the schedule and timing with which the profiles are serviced to adjust the operation of the mechanical system while the mechanical system is in operation. For example, the host computer system may determine based on information returned from motion control processor 16 or external input that the speed of the mechanical system should be changed. Host system 12 could then compute (or retrieve from on-line storage) a new set of profiles for controlling the mechanical system at the new speed and initiate this new rate of operation by downloading and starting the new profiles at an appropriate quiescent time in the operational cycle. Similarly host computer system 12 might determine that a sensor reading was becoming uncertain and download a new schedule for tick period duration to increase the frequency with which that sensor was read. Thus the ability to download profiles, schedules, and tick period duration during operation of the mechanical system provides the subject invention with a heretofore unknown capability for adaptive operation of mechanical systems. (This is not to imply that adaptive controllers were not known, but only that in the prior art the controller architecture must anticipate the need for adaptation. In the subject invention the ability to download profiles, schedules and tick period durations during operation provides a novel capability for on-line "recalibration" of the software.)

It should be noted that adjustment of the tick period duration may require modification of the profiles to maintain system timing. (e.g. the number of tick periods constituting a timeout threshold may have to be adjusted). Alternatively a scaling factor based on the tick period duration can be incorporated in system timing parameters to compensate for changes in the tick period duration.

Figure 2:
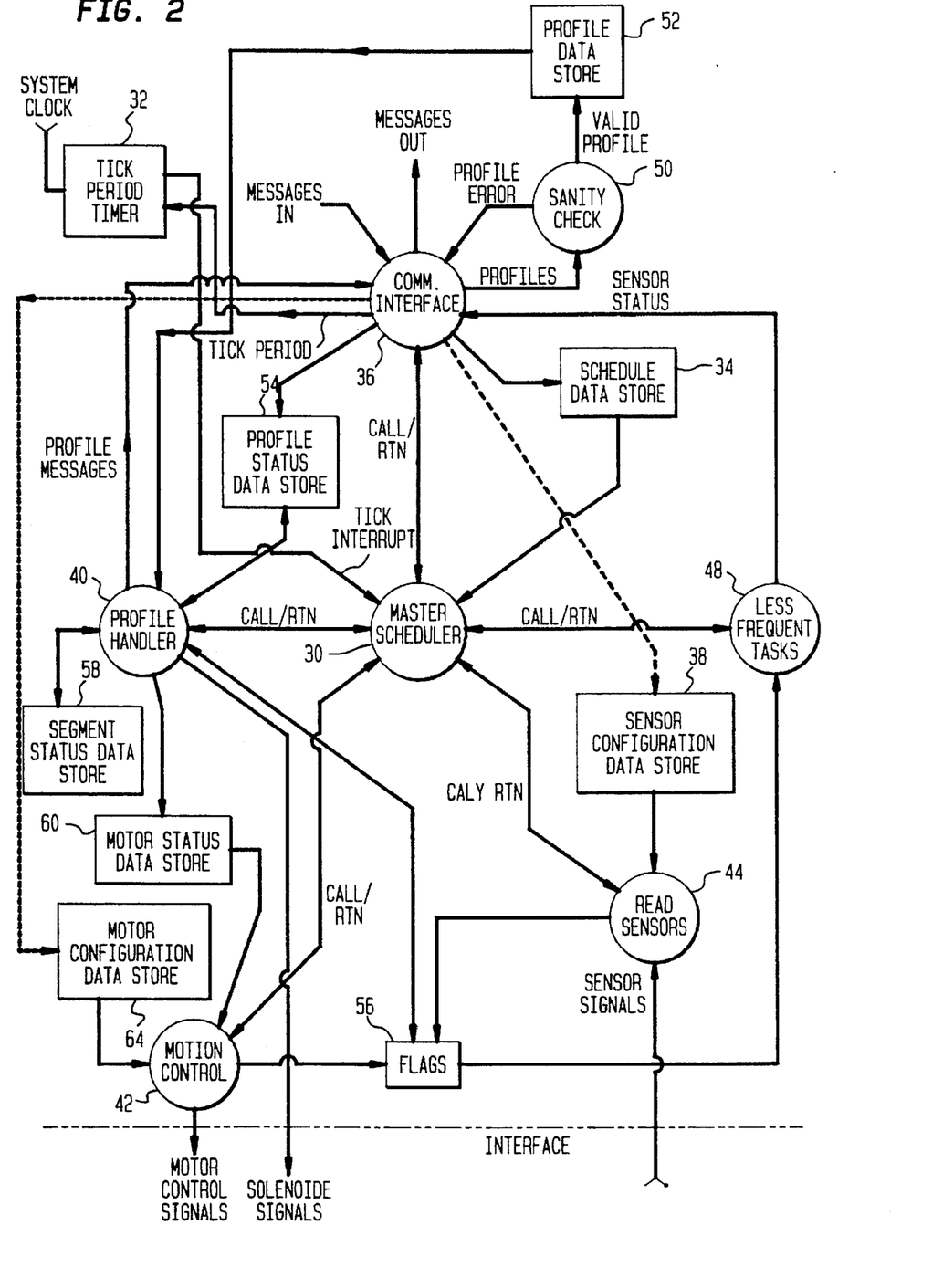
FIG. 2 is a representation of relationships between tasks performed by a motion control processor used in the apparatus of FIG. 1.

FIG. 2 shows the software architecture for motion control processor 16. Master scheduler 30 schedules tasks to be performed by motion control processor 16 in accordance with schedule 34. Schedule 34 consist of a sequence of tick periods which are initiated by a tick period interrupt generated by tick period timer 32 which is driven by a system clock. (Not shown) Tasks performed by motion control processor 16 include communications interface task 36, which handles communications to host computer system 12 from motion control processor 16; profile handler task 40, which services active profiles; motion control task 42, which responds to profile handler 40 to generate motor control signals; and read sensor task 44 which reads sensors in the mechanical system and sets corresponding flags. Preferably motion control processor 16 also include other (less frequent) tasks 48. Other tasks 48 are tasks which are useful but which are not necessary for the control function of motion control processor 16 For example such tasks might include logging data which would be useful for diagnostics; monitoring motor currents; or setting sensor threshold levels. Such tasks are routine and form no part of the subject invention, and need not be discussed further here. Preferably other tasks 48 also include reading flags and returning this information to host computer system 12. Note that the flag information is returned to host computer system 12 for information purposes and does not play an immediate role in the control function of apparatus 10. Host computer system 12 influences the mechanical system by,changing the set of active profiles, or by downloading new profiles, schedules or tick period durations, as described above.

It is a particular advantage of the subject invention that the priority of tasks in schedule 34 can be optimized for each application and can be changed in response to varying conditions. In general the highest priority is given to servicing motors by motion control task 42. In a preferred embodiment of the subject invention the next priority is given read sensor task 44. Transmission of messages to host computer system 12 by communications task 36 is given third priority. Profile handler task 40 is given fourth priority and is scheduled for every other tick period. Preferably the tick period will be set for a long enough duration that all motors and profiles may be serviced during a tick period but, if unusual circumstances cause these task to overrun a tick period, they may be nested when the next tick period interrupt occurs, as will be described further below. Less frequent task 48 are scheduled still later and less frequently in the tick periods. Finally, any remaining time in a tick period is used to run background tasks which are not time critical. Such background tasks would include formatting of messages and running diagnostics routines as well as receipt of messages from host computer system 12 by communications interface task 36.

Returning to FIG. 2 communications interface task 36 handles messages received from and sent to host computer system 12 over communications link 14. If a message downloads a profile, communications interface 36 calls sanity check task 50 to perform a superficial consistency check on the profile. Sanity check 50 examines a downloaded profile to determine if elements which are acted upon by the profile are actually in the mechanical system and are consistent with the actions commanded; that is the profile does not attempt to accelerate a sensor or the like and/or other similar, simple high level consistency tests. Valid profiles are stored in profile data store 52. Sanity check 50 returns a profile error message to communications interface 36 for transmission to host computer system 12 if the profile is not valid. If a message defines a new schedule the schedule is stored in schedule data store 34, and if a message defines a new tick period duration communications interface 36 resets tick period timer 32. Preferably new schedules and tick period duration's will be transmitted in a single message. Communications interface 36 also returns sensor status messages generated by less frequent tasks 48 and messages generated by profile handler 40 (e.g. profile complete messages) to host computer system 12.

Profile handler task 40 services all active profiles each time it is called. Profile handler 40 accesses and updates profile status data store 54 to determine the currently active set of profiles which are being executed to control the mechanical system to perform a selected function and accesses and updates segment status data store 58 to identify the currently executing segment of each active profile. In response to profile commands profile handler 40 will read and set flags 56 to determine and indicate status changes, will generate solenoid control signals to control solenoids in the mechanical system and will send predetermined messages, such as messages indicating that a profile has been completed, to host computer system 12 Profile handler 40 also updates motor status data store 60 when execution of a profile causes a change in motor status.

Motion control task 42 accesses motor status data store 60 to determine changes in status for each motor in the mechanical system and generates appropriate control signals through interface and drivers 20. Motion control 42 also accesses motor configuration data store 64 for data necessary to generate appropriate motor control signals (i.e. Motor Configuration Block data and control algorithms). Such data would include the motor type, any parameters necessary for the motor control algorithm executed by motion control task 42 and the identity of the logical port to which a particular motor is connected. Motion control task 42 also sets flags 56 to indicate completion of particular motor control tasks.

Read sensors task 44 reads all sensors in the mechanical system when called and sets flags 56 accordingly. Generally read sensors task 44 will average or filter sensor readings to minimize the effects of noise and will access sensor configuration store 68 to determine the appropriate filtering algorithm to use (i.e. Sensor Configuration Block data).

Figure 3:
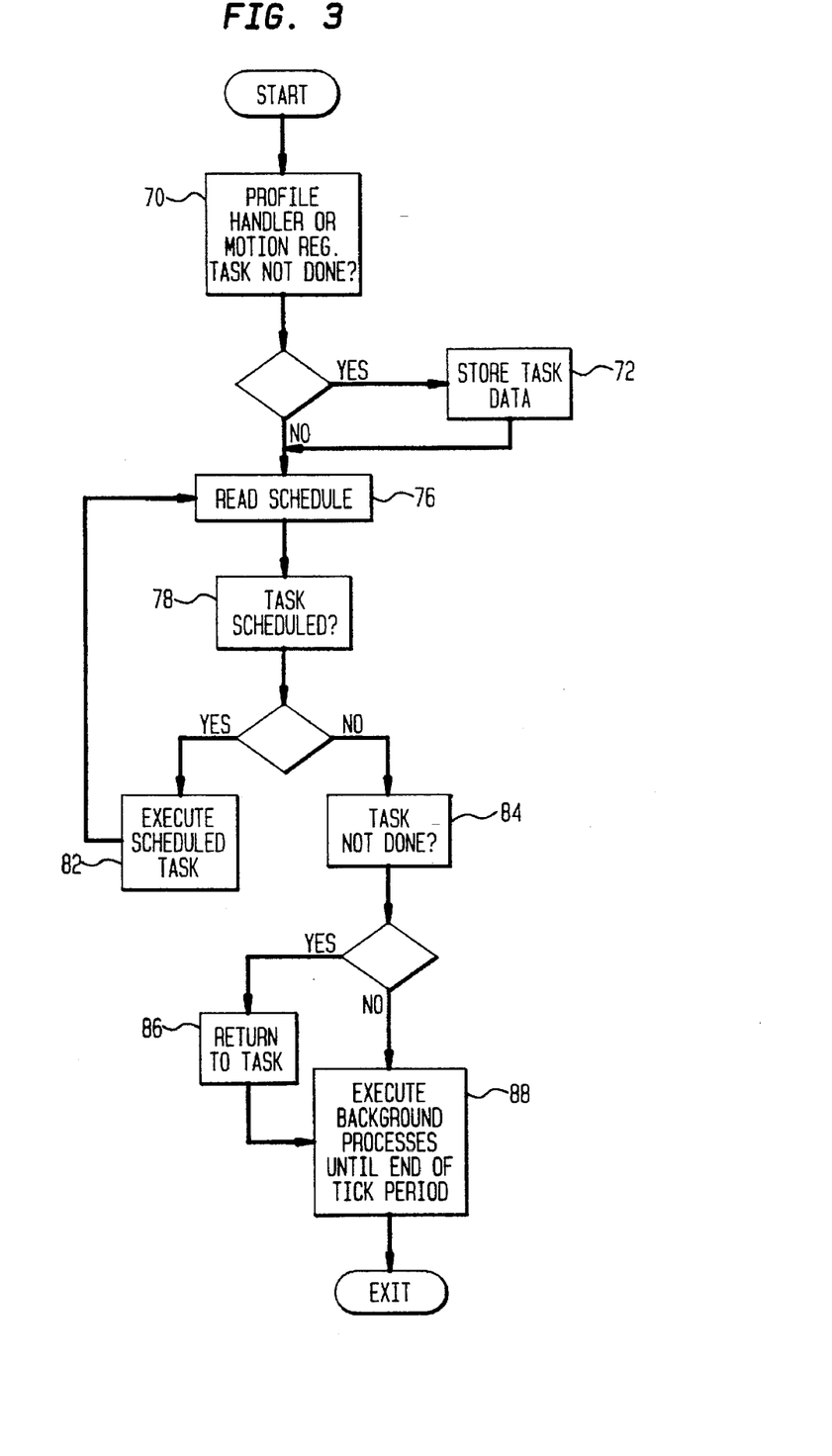
FIG. 3 is a flow diagram of a master scheduler for scheduling tasks shown in FIG. 2 in accordance with priorities as shown in FIG. 3.

FIG. 3 shows a flow diagram of the operation of master scheduler 30. At 70, in response to a tick period interrupt, schedule 30 determines if a preceding profile handler has not been completed. If a task has not been completed then at 72 master scheduler 30 stores the data for that task. After data for incomplete profile handler or motion regular task is stored, or if those tasks are complete, at 76 master scheduler 30 reads the schedule in schedule data store 34, and at 78 determines if a task is scheduled. If a task is scheduled then at 82 master scheduler 30 calls the schedule task for execution and when the scheduled task is complete returns to 76 to again read the schedule. If no task is scheduled at 78, then at 84 master scheduler 30 determines if a previous profile handler task was not completed and if a task has not been completed then at 86 master scheduler 30 returns to the incomplete task. This nesting of incomplete tasks at tick period interrupts assures that profiles which are delayed by unusual circumstances will be serviced again as quickly as possible while still assuring that other necessary tasks are carried out in accordance with the schedule. When incomplete tasks are completed, or if no task is incomplete, then at 88 master scheduler 30 executes background processes until the end of the tick period.

Figure 4:
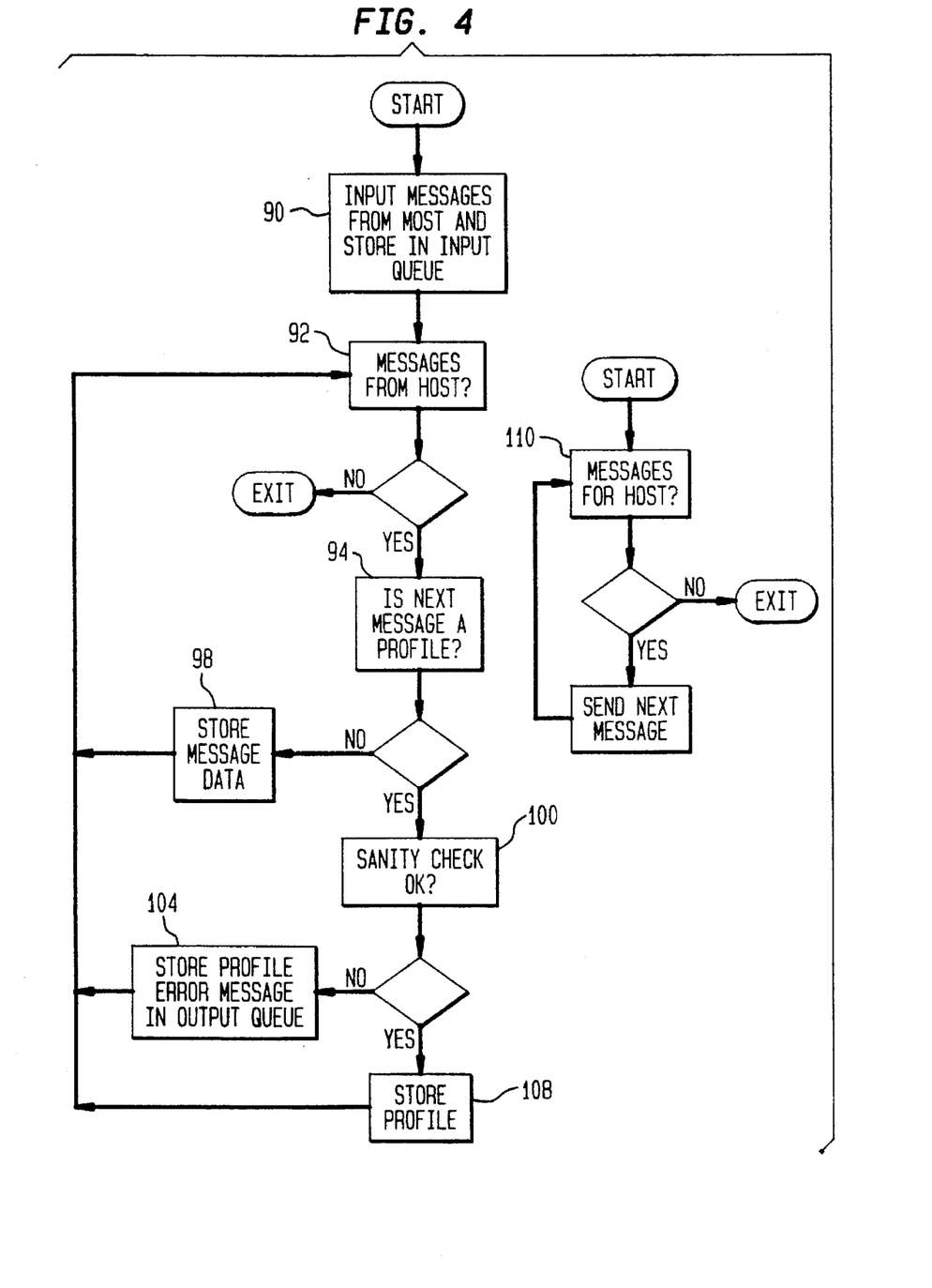
FIG. 4 is a flow diagram of a communications interface task shown in FIG. 2.

FIG. 4 shows a flow diagram of the operation of communications interface task 36. (While shown as a single task in FIG. 2 for ease of illustration, communications interface 36 comprises, as noted above, a scheduled output task which is preferably a background task for transmission of messages to host computer system 12, and an input task which is preferably a scheduled task for input of messages from host computer system 12.)

Figure 5A:
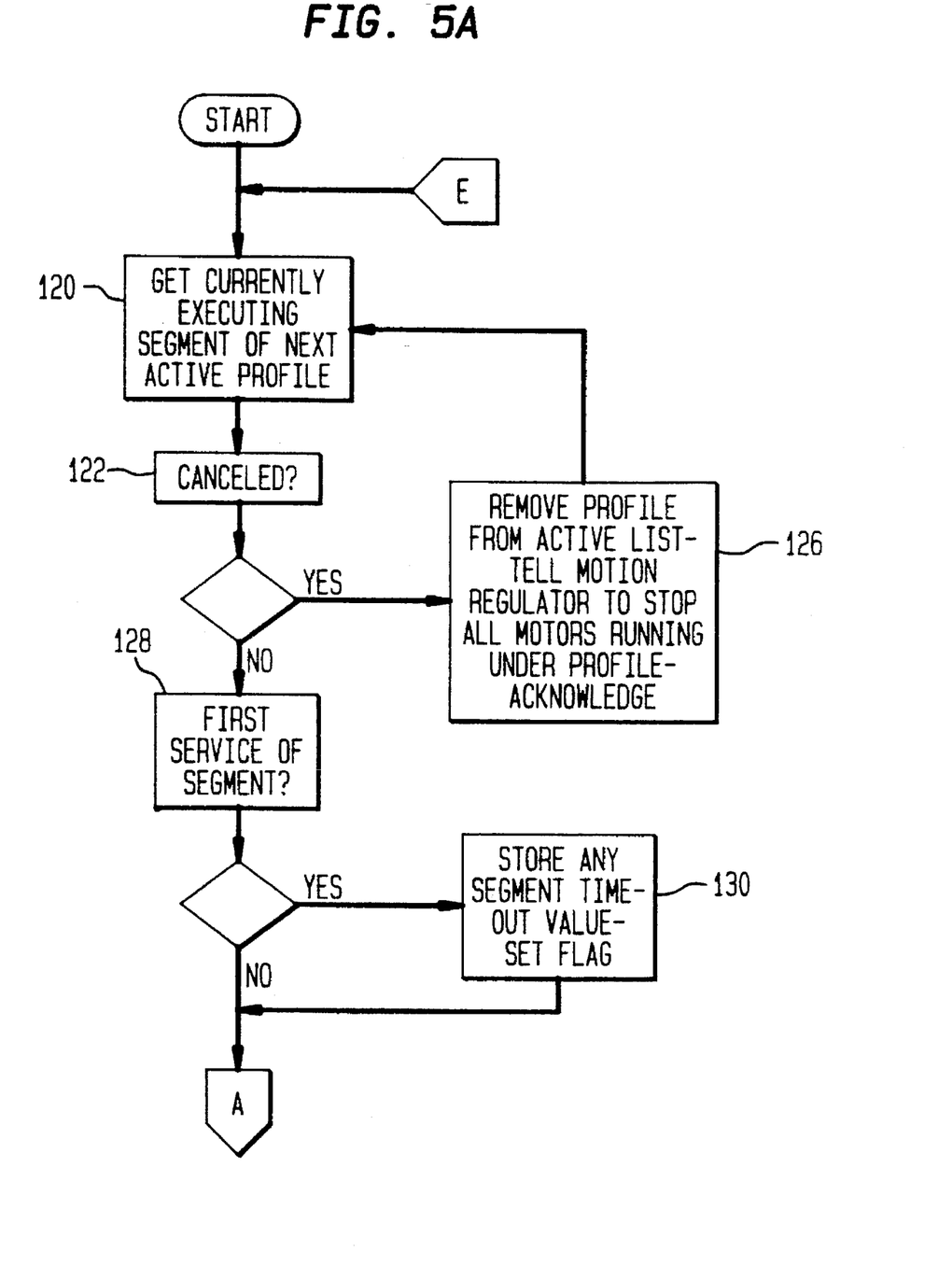
FIGS. 5a, 5b and 5c show a flow diagram for a profile handler task shown in FIG. 2.
Figure 5B:
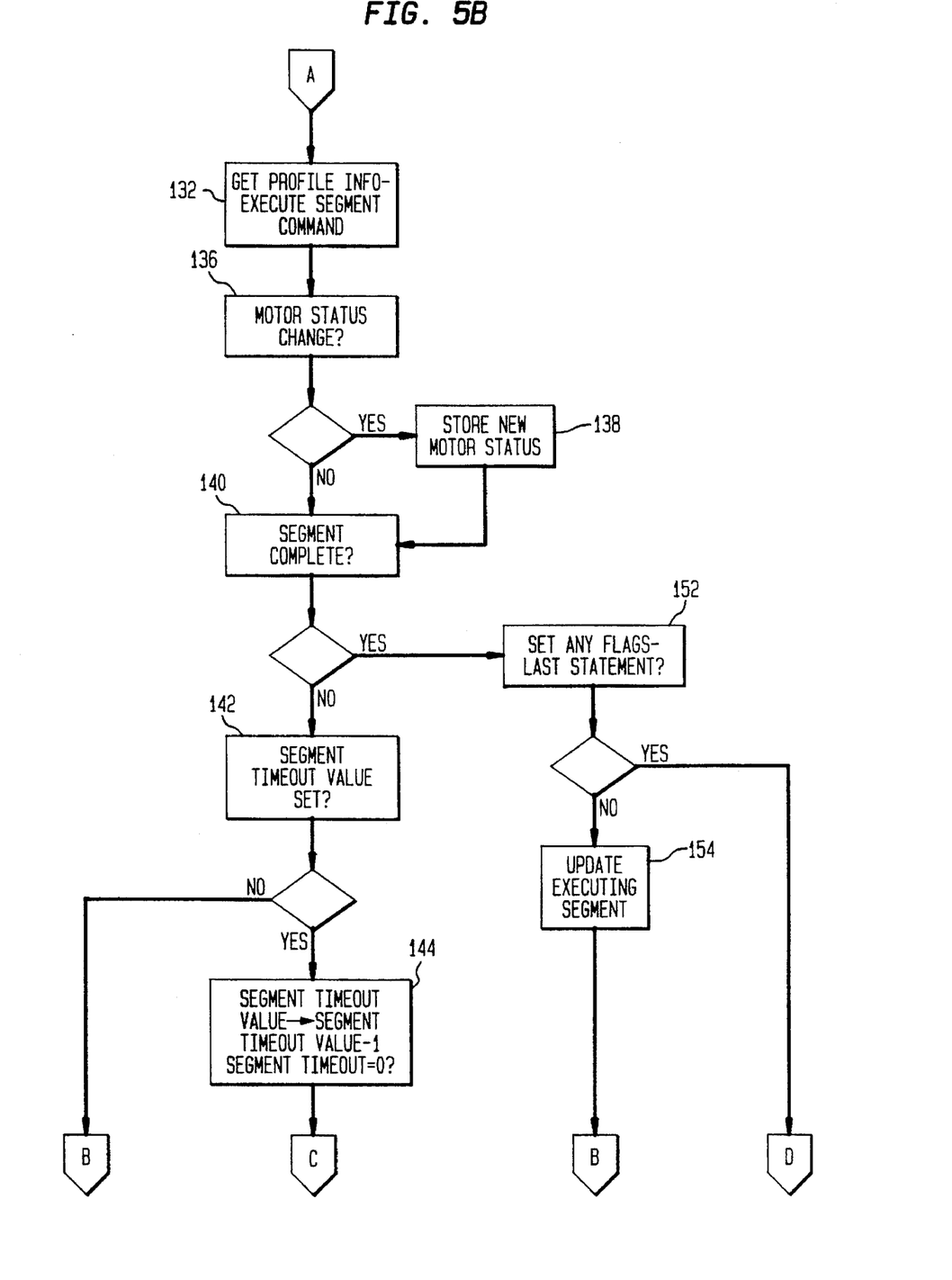
Figure 5C:
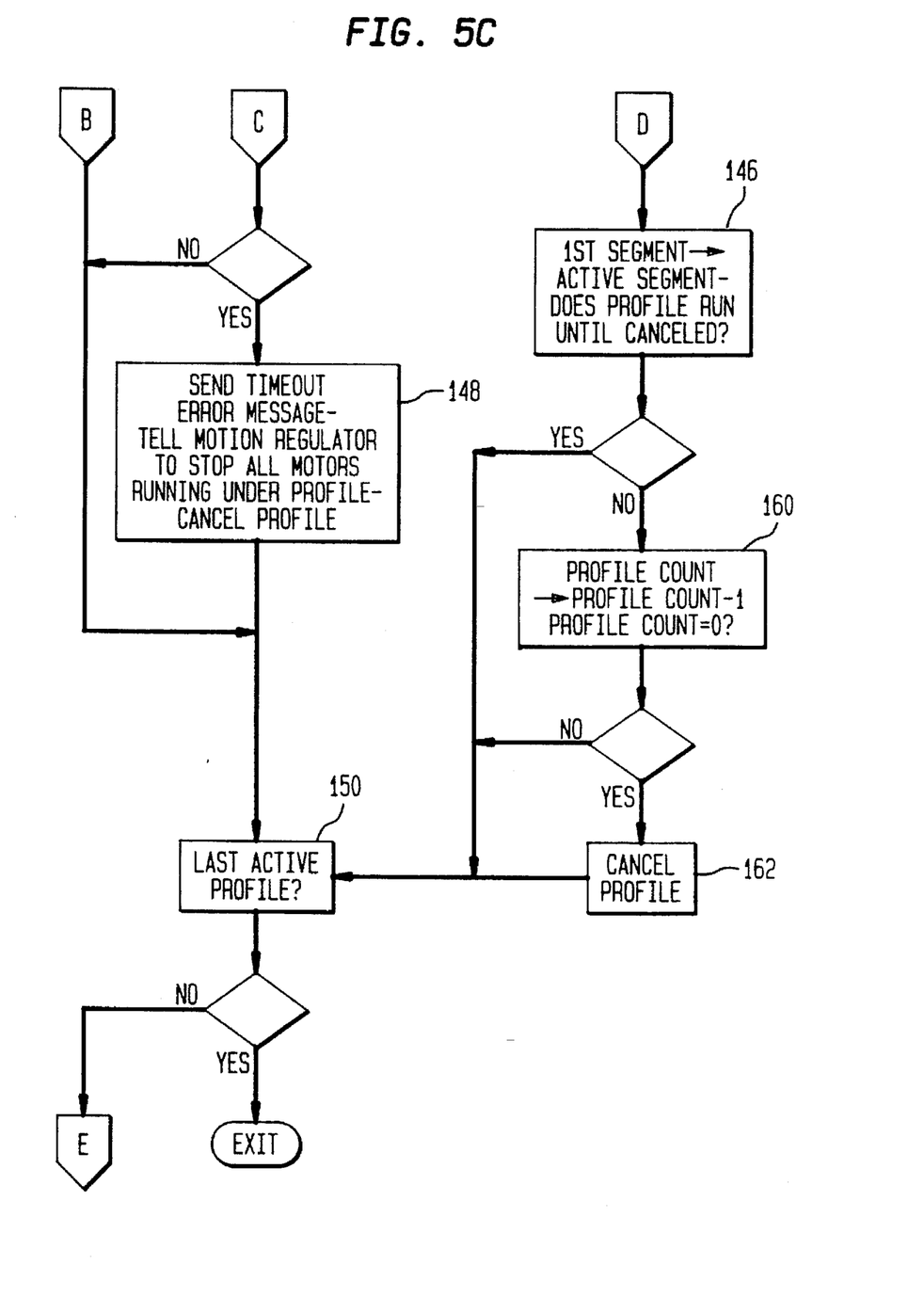

If communications interface 36 is called to input messages then at 90 communications interface 36 inputs any pending messages from host computer system 12 and stores such messages in an input queue. At 92 communications interface 36 determines if any messages have been received and, if so, at 94 determines if the next message is a downloaded profile. If the message is not a profile then at 98 the message data is stored in the appropriate data store. If the message is a downloaded profile then at 100 communications interface 36 calls sanity check routine 50 to determine the superficial consistency of the profile, as described above. If the downloaded profile does not pass sanity check 50, sanity check 50 returns an error message to communications interface 36 at 104 and communications interface 36 returns to 92. Otherwise, the valid profile is stored in profile data store 52 and communications interface 36 returns to 92. If at 92 communications interface 36 determines that there are no more input messages it exits. If interface 36 is called to output messages then at 110 communications interface 36 determines if there are messages pending for host computer system 12. If there are messages pending then, at 112, communications interface 36 sends the next message and returns to 110. When no messages remain communications interface 36 exits and returns to master scheduler 30, FIGS. 5A, 5B, and 5C show a flow diagram of the operation of profile handler task 40. At 120 profile handler 40 identifies the currently executed segment of the next active profile, and at 122 accesses profile status data store 54 to determine if the profile has been canceled in response to a profile cancel message from host computer system 12. If so then at 126 profile handler 40 removes the canceled profile from the list of active profiles, updates motor status data store 60 to tell motion controller 42 to stop all motors running under the canceled profile and acknowledges the cancellation by returning an appropriate message to host computer system 12, and returns to 120.

Assuming that the profile has not been canceled then at 128 profile handler 40 determines if this is the first time the segment has been serviced since it was last completed. If so profile handler 40 stores any segment timeout value and sets an appropriate flag 56. Once any timeout value is stored, or on subsequent services, then at 132 in FIG. 6B profile handler 40 gets the appropriate profile information from profile data store 52 and executes the segment command. Then at 136 profile handler 40 determines if a motor status has been changed and if so, at 138 stores the new motor status in motor status data store 60. After storing any new motor status, or if no motor status change results from execution of the segment command, then at 140 profile handler 40 determines if the segment is complete. If the segment is not complete then at 142 profile handler 40 determines if a segment timeout value has been set for the executing segment and, if so, then at 144 decrements the segment timeout value and determines if the segment timeout value is equal to zero. Generally, at 144, the timeout value is decremented by 1; however, if the profile handler overruns the tick period, the scheduler, at 72 (FIG. 3), will account for intervening tick periods and the timeout value will be decremented accordingly to maintained system timing integrity.

(Since any segment timeout value typically is only decremented once each time a segment is serviced, i.e. once each tick period, it is apparent that timeout values are long with respect to tick periods. Thus if a segment waits for a flag to be set a timeout value may be tens of milliseconds or longer, while the tick period duration may be only a millisecond.)

If at 144 the timeout value equal zero then at 148 message handler 40 sends a timeout error message to host computer system 12, updates motor status data store 60 to stop all motors running under the profile including the segment which timesout, and cancels that profile. Then, or if the timeout value does not equal zero, or no timeout threshold value has been set, at 150 profile handler 40 determines if this is the last active profile and if so exits and returns to master scheduler 30. If not profile handler 40 returns to 120 (FIG. 5A).

Returning to 140 if the segment is complete then at 152 any flags identified in the segment data structure are set and profile handler 40 determines if this is the last segment in that profile. If it is not the last segment then at 154 profile handler 40 updates the currently executing segment and goes to 150. Otherwise at 156 profile handler 40 updates the currently executing segment to be the first segment in the profile, and accesses profile data store 52 to determine if the profile runs until canceled. If so data handler 40 goes to 150. If not, then at 160 the profile count identifying the number of cycles the profile is to executed is decremented and profile handler 40 determines if the profile count equals zero. If the count equal zero then at 162 the profile is canceled. Then, or if the count does not equal zero, profile handler 40 goes to 150.

Figure 6:
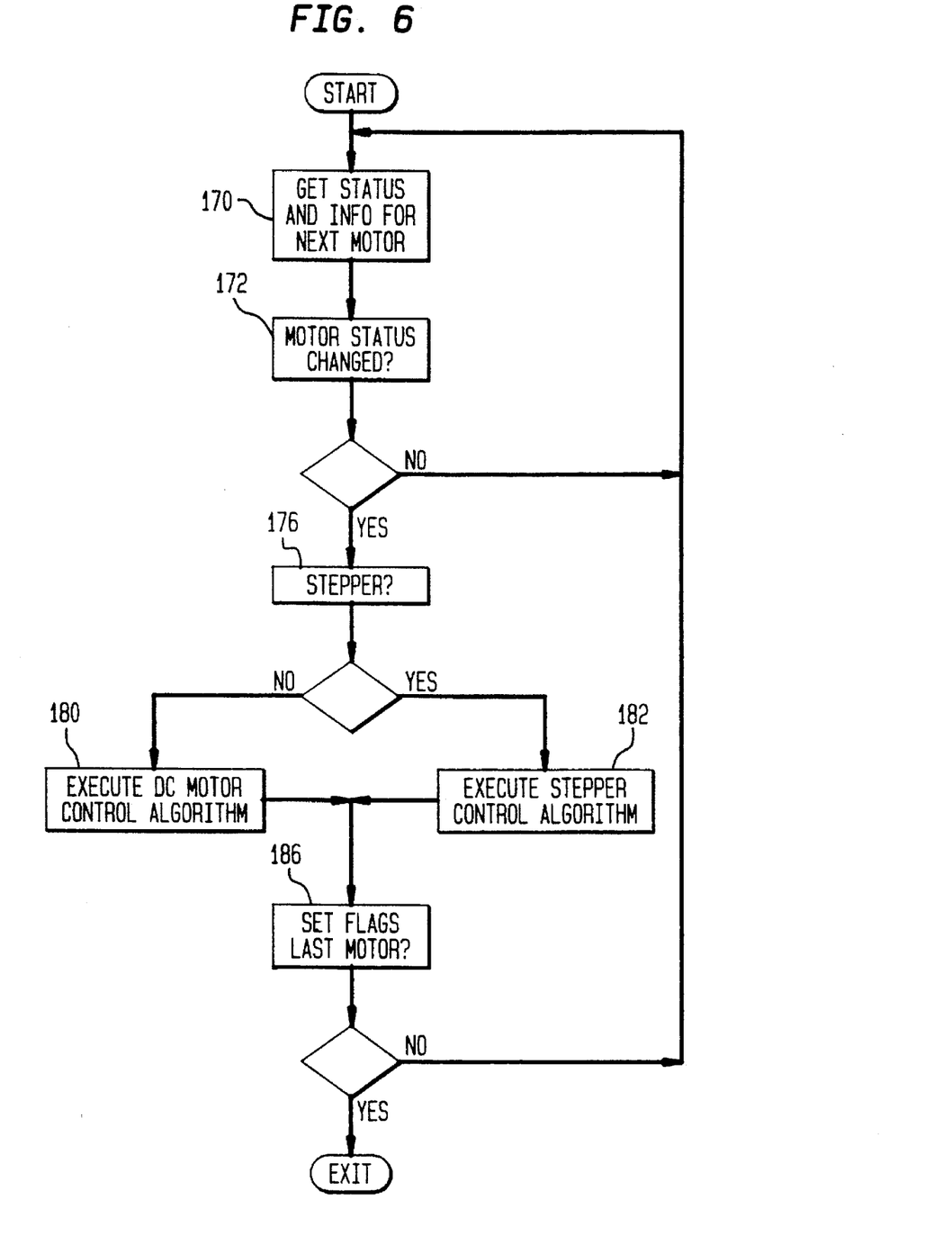
FIG. 6 shows a flow diagram for a motion regulator task shown in FIG. 2.

FIG. 6 shows a flow diagram of the operation of motion control task 42. At 170 motion controller 42 gets status information from motor status data store 60 and motor configuration information from motor configuration data store 64 for the next motor. Preferably information in data store 64 is downloaded from host computer system 12 through communications interface 36. However, since motor configuration information represents a physical configuration in the mechanical system it need only be downloaded when motion control processor 16 is initialized. Alternatively, motion configuration data store 64 can be read only memory or other forms of non-volatile memory. At 172 motion control task 42 determines if the motor status has been changed that is motion control handler 42 determines if some action such as breaking a running motor or accelerating a stopped motor is to be carried out. If there is no change in status motion control handler 42 returns to 170. If there is a change in status, at 176 motion control handler 42 determines if the present motor is a stepper motor or a DC motor. Depending on the results at 176 motion control task 42 either executes a DC motor control algorithm at 180 or a stepper control algorithm at 182 to control the motor in accordance with the change and its status. In a preferred embodiment, the appropriate algorithm for each motor is stored in motor configuration data store 64; so that determination of the motor type and selection of the proper algorithm become merged. Algorithms for control of DC motors and stepper motors are well known to those skilled in the art and need not be discussed further here for an understanding of the subject invention. In a preferred embodiment of the subject invention control of stepper motors is carried out in accordance with a novel control algorithm as described in commonly assigned, co-pending U.S. patent application Ser. No. 08/327,249 (filed on even date herewith, which is hereby incorporated by reference.) Then, at 186, motion control handler 42 sets any required flags to indicate that the motion control task has been carried out and determines if this is the last motor. If not, motion control task 42 returns to 170; and otherwise exits to return to master scheduler 30.

By separating the motion control task from the profile handler tasks changes in motor processor types require only that the motion control task be reprogrammed; with few or no changes needed for other tasks or in host system 12, or in the profiles.

Figure 7:
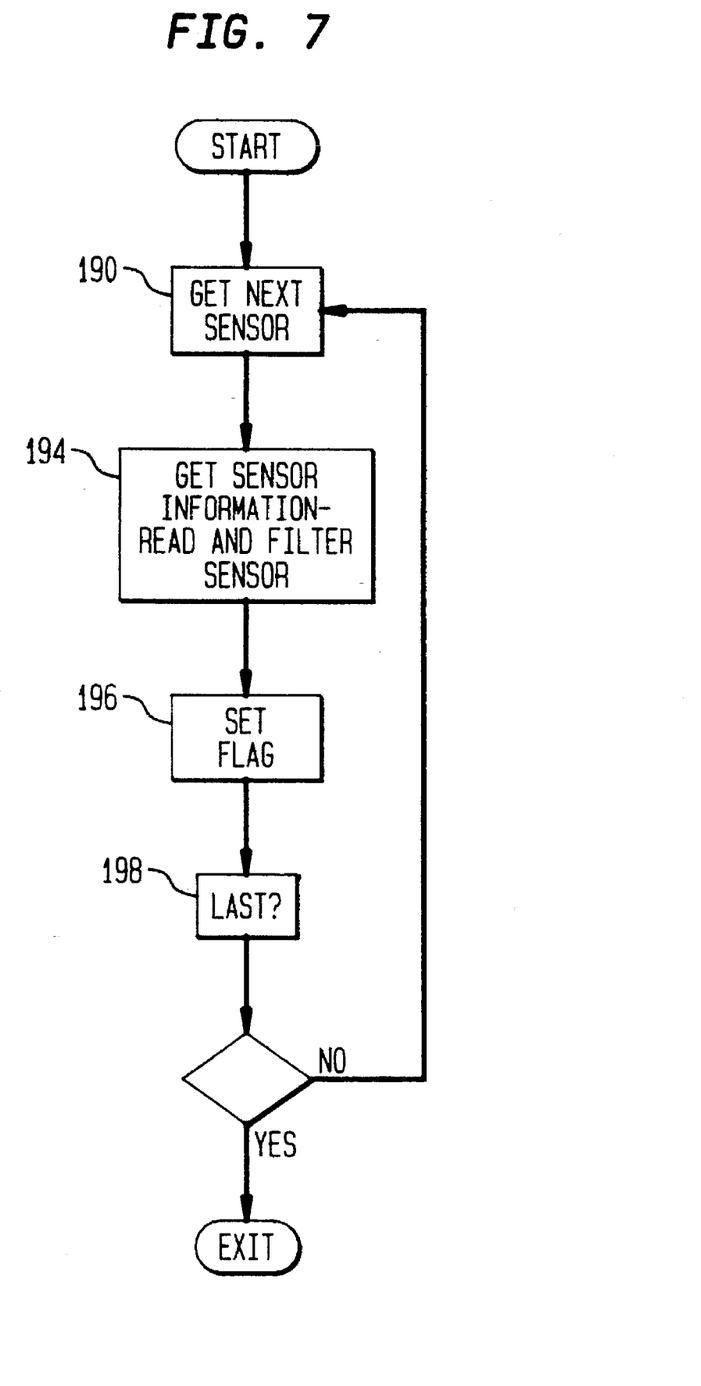
FIG. 7 shows a flow diagram for a read sensor task shown in FIG. 2.

FIG. 7 shows a flow diagram of the operation of read sensor task 44. At 190 read sensors task 44 identifies the next sensor to be read and at 194 gets sensor information from sensor configuration data store 68 and reads and filters the next sensor. The sensor signals are filtered by averaging or by any other conventional, well-known technique to minimize the effects of noise. Sensor configuration information identifies the type of sensor and the appropriate filtering algorithm to be used; and since it, like motor configuration information, represents a physical configuration in the mechanical system, it is downloaded similarly from host computer system 12 or is stored in non-volatile memory. Then at 190 read sensors task 44 sets appropriate flags 56, and at 198 determines if this is the last sensor to be read. If not read sensors task 44 returns to 190 or otherwise exits and returns to master scheduler 30.

The above description has been provided by way of illustration only and those skilled in the art will be aware of numerous other embodiments of the subject invention from consideration of the above detailed description and the attached drawings. Accordingly, limitations on the subject invention are to be found only in the claims set forth below.

What is claimed is:

1. An apparatus for controlling a mechanical system in response to classes of messages from a host computer system, said apparatus comprising:
   a) communications means for receiving a first class of messages from said host computer system to selectively activate profiles and a second class of messages from said host computer system that cancels said previously activated profiles;
   b) interface means for transmitting control signals to, and receiving status signals from, said mechanical system;
   c) a motion control processor responsive to said messages and said status signals to generate said control signals in accordance with a selected set of profiles.

2. An apparatus as described in claim 1 wherein a third class of said messages downloads profiles from said host computer system for storage in said motion control processor.

3. An apparatus as described in claim 2 wherein said motion control processor performs a sanity check on said downloaded profiles to assure said downloaded profiles are consistent with said mechanical system.

4. An apparatus as described in claim 2 wherein said host computer system downloads new profiles to said motion control processor during operation of said mechanical system to change operating parameters of said mechanical system.

5. An apparatus for controlling a mechanical system in response to messages from a host computer system, said apparatus comprising:
   a) communications means for receiving a first class of messages from said host computer system to selectively activate profiles and a second class of messages from said host computer system that cancels said previously activated profiles;
   b) interface means for transmitting control signals to, and receiving status signals from, said mechanical system;
   c) a motion control processor for executing a selected set of profiles in accordance with said messages, said status signals and a schedule stored in said motion control processor to control said mechanical system to carry out a corresponding function.

6. An apparatus as described in claim 5 wherein said schedule comprises a sequence of tick periods having a selected duration.

7. An apparatus as described in claim 6 wherein a class of said messages downloads said schedule to said motion control processor during operation of said mechanical system; whereby operation of said mechanical system can be optimized.

8. An apparatus as described in claim 7 wherein said class of messages downloads said tick period duration to said motion control processor.

9. An apparatus as described in claim 5 wherein another class of messages downloads said tick period duration to said motion control processor during operation of said mechanical system; whereby operation of said mechanical system can be optimized.

10. An apparatus as described in claim 7 wherein said motion control processor executes a profile handler task in accordance with said schedule, said profile handler task servicing each profile in said set of profiles.

11. An apparatus as described in claim 10 wherein one segment of each of said set of profiles is a currently active segment and said profile handler task services each of said currently active segments during each of said tick periods during which said profile handler task is scheduled.

12. An apparatus as described in claim 11 wherein a least one of said profiles determines changes in the operational status of at least one motor in said mechanical system and said profile handler task stores said changes in a predetermined data store.

13. An apparatus as described in claim 12 wherein said motion control processor executes a motion control task in accordance with said schedule, said motion control task responding to said operational status changes to change the operating mode of said at least one motor.

14. An apparatus as described in claim 10 wherein at last one of said profiles determines changes in the operational status of at least one motor in said mechanical system and said profile handler task stores said changes in a predetermined data store.

15. An apparatus as described in claim 14 wherein said motion control processor executes a motion control task in accordance with said schedule, said motion control task responding to said operational status changes to change the operating mode of said at least one motor.

16. In an apparatus for controlling a mechanical system in response to messages from a host computer, a motion control processor responsive to messages and to status signals from said mechanical system to generate executing a plurality of tasks in accordance with a schedule stored in said motion control processor, said tasks including;
   a) a communications interface task for handling, a first class or messages from said host computer system to selectively activate profiles and a second class of messages from said host computer system that cancels said previously activated profiles;
   b) a profile handler task for executing a selected set of profiles to control said mechanical system to carry out corresponding mechanical functions;
   c) a motion control task, responsive to said profile handler task to control operation of motors in said system; and
   d) a read sensors task to mad the status of sensors in said mechanical system.

17. A motion control processor as described in claim 16 wherein said schedule comprises a sequence of tick periods having a selected duration.

18. A motion control processor as described in claim 17 wherein said schedule is downloaded from said host computer system to said motion control processor.

19. A motion control processor as described in claim 17 wherein said tick period duration is downloaded from said host computer system to said motion control processor.

* * * * *